United States Patent [19]

Osawa et al.

[11] Patent Number: 4,480,268
[45] Date of Patent: Oct. 30, 1984

[54] GAMMA CORRECTION CIRCUIT

[75] Inventors: Michitaka Osawa; Hitoshi Maekawa, both of Yokohama, Japan

[73] Assignee: Hitachi, Ltd., Tokyo, Japan

[21] Appl. No.: 384,716

[22] Filed: Jun. 2, 1982

[30] Foreign Application Priority Data

Jun. 3, 1981 [JP] Japan .................................. 56-84410

[51] Int. Cl.³ .............................................. H04N 5/20
[52] U.S. Cl. ...................................... 358/164; 328/142
[58] Field of Search ................ 358/164, 32; 328/142; 330/69, 296

[56] References Cited

U.S. PATENT DOCUMENTS

| | | | |
|---|---|---|---|
| 3,752,905 | 8/1973 | Schneider | 358/164 |
| 4,015,079 | 3/1977 | Satov et al. | 328/142 |
| 4,278,839 | 7/1981 | Marik | 328/142 |

*Primary Examiner*—John C. Martin
*Assistant Examiner*—Michael D. Parker
*Attorney, Agent, or Firm*—Antonelli, Terry & Wands

[57] ABSTRACT

A gamma correction circuit is provided with a first circuit including a first linear element and a first non-linear element connected in series in the above order and a second circuit including a second non-linear element and a second linear element connected in series in the above order. A first connection point is located between the first linear element and the second non-linear element and a second connection point is located between the first non-linear element and the second linear element. A current source for converting a video signal voltage into a current output is connected to the second connection point. Two common collector (or common drain) transistors have their collectors (or their drains) connected to a power supply line. The input terminals of these transistors are connected to the connection point between the first linear element and the first non-linear element and to the connection point between the second non-linear element and the second linear element respectively, and the output terminals are connected to each other through a resistor. In order to decrease the junction capacitance of the transistors as the video signal voltage level increases, a voltage regulator circuit is connected between the power supply line and the first connection point.

4 Claims, 3 Drawing Figures

GAMMA CORRECTION CIRCUIT

BACKGROUND OF THE INVENTION

This invention relates to a gamma correction circuit having its frequency characteristic extended to a broader band.

A gamma correction circuit comprising the combination of a linear amplifier and a non-linear amplifier and capable of continuously varying the gamma value is described in, for example, a book entitled "Gazo Denshi Kairo (Video Electronic Circuits)" published by Corona-sha Inc. in Japan on Jan. 20, 1979. Such a circuit will be explained with reference to FIG. 1.

Referring to FIG. 1, a current source 5 supplies a video signal current to a linear amplifier 6 and a non-linear amplifier 7, which include non-linear elements or diodes 8a, 8b, linear elements or resistors 9a, 9b and common collector transistors 10a, 10b, respectively. A variable resistor 11 for setting the gamma value is connected between the emitters of the transistors 10a and 10b.

The video signal current of current value $2i_S$ supplied from the current source 5 is equally divided into halves by the two lines composed of the diodes 8a, 8b and resistors 9a, 9b respectively, so that the current of current value $i_S$ flows through each of the two lines. This current of current value $i_S$ flows through the series-connected linear element and non-linear element in each line, resulting in a voltage drop across these elements. Output potentials $e_L$ and $e_N$ determined by the voltage drop across those elements appear at the emitters of the transistors 10a and 10b respectively, and these potentials are applied to the fixed terminals respectively of the variable resistor 11.

The internal resistance value of the diode 8b, which is the non-linear element, is dependent upon the current value $i_S$. Therefore, the output $e_N$ of the non-linear amplifier 7 varies in non-linear relation to the input voltage (when the current of current value $2i_S$ is converted into the voltage by the linear element). Thus, the gamma value can be corrected as desired by suitably varying the mixing ratio of the output $e_N$ of the non-linear amplifier 7 and the output $e_L$ of the linear amplifier 6.

For the purpose of ensuring completely satisfactory operation of the circuit, it is required that the output $e_N$ of the non-linear amplifier 7 is equal to the output $e_L$ of the linear amplifier 6 at the white peak level and black level of a video signal. Thus, when the current value $2i_S$ of the video signal current is selected to be $2i_S=0$ at the black level, the value of each of the outputs $e_N$ and $e_L$ is equal to the power supply voltage $V_{cc}$, and the outputs $e_N$ and $e_L$ can be made equal to each other. On the other hand, at the white peak level, it is required that the resistance value $R_N$ of the diodes 8a and 8b is equal to the resistance value $R_L$ of the resistors 9a and 9b at the existing current value $i_S$.

Generally, the junction capacitance of a transistor increases sharply with the decrease in the level of a voltage applied thereacross. Therefore, in the circuit shown in FIG. 1, the base-collector junction capacitance of the transistors 10a and 10b increases sharply as the signal level approaches the black level. The increase in the base-collector junction capacitance of the transistors 10a and 10b means the increase in the input capacitance of the linear amplifier 6 and non-linear amplifier 7. Consequently, at the black level, the time constant determined by this input capacitance and the resistance value of the input circuit including the elements having the resistance values $R_N$ and $R_L$ increases to lower the cutoff frequency fc of the gamma correction circuit. Therefore, the prior art gamma correction circuit has been defective in that it is not applicable to a display unit requiring a high resolution.

SUMMARY OF THE INVENTION

It is a primary object of the present invention to provide an improved gamma correction circuit which obviates the prior art defect pointed out above and has a frequency characteristic extended to a broader band.

The present invention which attains the above object is featured by the fact that the bias voltage applied to each of the transistors in the linear and non-linear amplifiers is so selected that the junction capacitance may not excessively increase even when each of the transistors operates under a condition in which the frequency is closest to the cutoff frequency $f_c$. In other words, biasing means is provided for each of the transistors so that the diode junction formed between the electrodes other than the output electrode can be reverse biased even in the cutoff state of the transistor.

DESCRIPTION OF THE PREFERRED EMBODIMENTS

Figure 1:
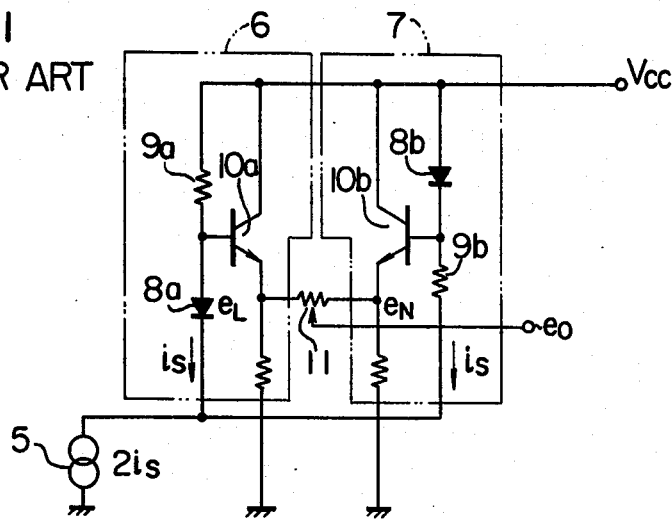
FIG. 1 is a circuit diagram showing the structure of a prior art gamma correction circuit.
Figure 2:
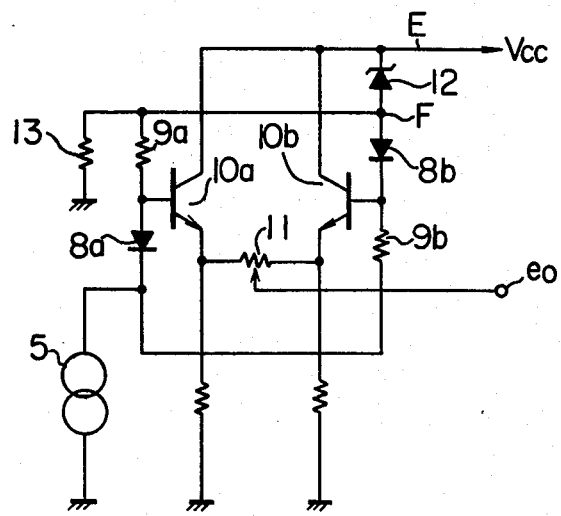
FIGS. 2 and 3 are circuit diagrams showing the structure of preferred embodiments of the gamma correction circuit according to the present invention respectively.

A preferred embodiment of the gamma correction circuit according to the present invention is shown in FIG. 2. Referring to FIG. 2, reference numerals 12 and 13 designate a voltage regulator diode and a bleeder resistor respectively, and the same reference numerals are used in FIG. 2 to designate the same parts appearing in FIG. 1. The bleeder resistor 13 is inserted for the purpose of satisfactorily maintaining the voltage regulating characteristic of the voltage regulator diode 12.

In this embodiment, the voltage regulator diode 12 is connected between the power supply line E and the connection point F of the resistor 9a and the diode 8b. Therefore, the voltage at the connection point F is fixed at the value (7 volts) obtained by subtracting the terminal voltage (5 volts) of the voltage regulator diode 12 from the power supply voltage $V_{cc}$ (12 volts). At the black level, the current flowing through the diodes 8a, 8b and resistors 9a, 9b is null, and the base potentials of the transistors 10a and 10b are equal to the voltage at the connection point F. Therefore, a voltage equal to the terminal voltage of the voltage regulator diode 12 is applied across the collector and the base of each of the transistors 10a and 10b. Thus, at this time, the collector-base voltage of each of the transistors 10a and 10b is lowest among those appearing when a television signal including various levels ranging from the white level to the black level is applied to the gamma correction circuit. Consequently, the collector-base junction capacitance of each of the transistors 10a and 10b is such that the capacitance value determined by the collector-base voltage is largest at the black level. Therefore, when the Zener voltage of the voltage regulator diode 12 is set at a suitable value determined by the operating characteristic of the transistors and the operating band of the circuit, the cutoff frequency $f_c$ can be made higher than the frequency band of the television signal, thereby obviating the defect of the prior art circuit.

Figure 3:
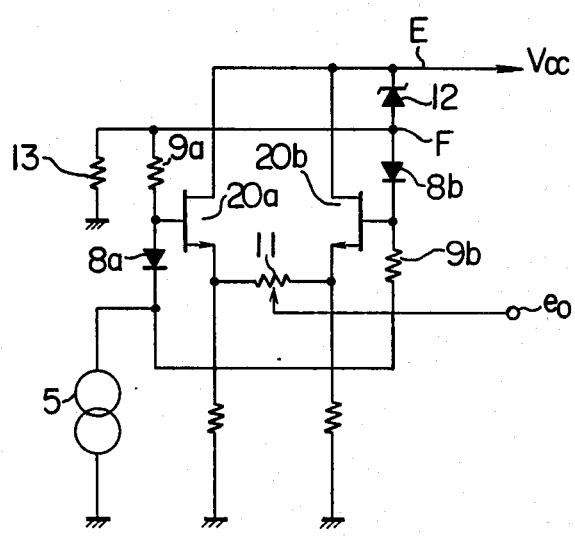

In the embodiment of the gamma correction circuit according to the present invention shown in FIG. 2, the common collector amplifiers including the bipolor transistors 10a and 10b are employed. In another embodiment of the gamma correction circuit of the present invention shown in FIG. 3, such amplifiers are replaced by common drain amplifiers including field effect transistors 20a and 20b to exhibit the effect similar to that exhibited by the former embodiment.

It will be understood from the foregoing description that, according to the gamma correction circuit of the present invention, a predetermined voltage can be applied across the collector and the base of the common collector amplifiers or across the drain and the gate of the common drain amplifiers even at the black level, so that the level of the cutoff frequency $f_c$ can be made higher. Thus, the present invention can provide a wideband gamma correction circuit which can operate without cutting off a television signal.

We claim:

1. A gamma correction circuit comprising:
   (a) a signal source;
   (b) a DC power source;
   (c) first biasing means connected at one of its terminals to said signal source and at the other terminal to said DC power source and generating at a terminal intermediate between said terminals a voltage varying in linear relation to a signal applied from said signal source;
   (d) second biasing means connected at one of its terminals to said signal source and at the other terminal to said DC power source and generating at a terminal intermediate between said terminals a voltage varying in non-linear relation to the signal applied from said signal source;
   (e) a first transistor including a common terminal, an output terminal and an input terminal connected to the intermediate terminal of said first biasing means;
   (f) a second transistor including a common terminal, an output terminal and an input terminal connected to the intermediate terminal of said second biasing means;
   (g) signal combining means connected to the output terminals of said first and second transistors for combining the signals appearing at said output terminals; and
   (h) voltage supplying means for supplying a first DC voltage to the common terminals of said first and second transistors and for supplyig to said other terminals of said first and second biasing means a second DC voltage deviating from said first DC voltage in a direction tending to decrease the junction capacitance of each of said transistors.

2. A gamma correction circuit as claimed in claim 1, wherein said DC power source includes a voltage regulator circuit connected to said voltage supplying means.

3. A gamma correction circuit as claimed in claim 2, wherein said voltage regulator circuit includes a Zener diode.

4. A gamma correction circuit comprising:
   (a) a signal source;
   (b) a first circuit including an output terminal generating a voltage varying the linear relation to a signal applied from said signal source;
   (c) a second circuit including an output terminal generating a voltage varying in non-linear relation to the signal applied from said signal source;
   (d) a first transistor including a common terminal, an output terminal and an input terminal connected to the output terminal of said first circuit;
   (e) a second transistor including a common terminal, an output terminal and an input terminal connected to the output terminal of said second circuit;
   (f) signal combining means for combining the signals appearing at the output terminals of said first and second transistors;
   (g) first biasing means for reverse biasing, through a portion of said first circuit, the diode junction formed between the input terminal and the common terminal of said first transistor;
   (h) second biasing means for reverse biasing, through a portion of said second circuit, the diode junction formed between the input terminal and the common terminal of said second transistor; and
   (i) voltage supply means for supplying a first DC voltage to the common terminals of said first and second transistors and for supplying to said first and second biasing means a second DC voltage deviating from said first DC voltage in a direction tending to decrease the junction capacitance of each of said transistors.

* * * * *